(12) United States Patent
Nagae

(10) Patent No.: US 11,290,603 B2
(45) Date of Patent: Mar. 29, 2022

(54) ASSISTANCE SERVER, TUNNEL CONNECTION ASSISTANCE METHOD AND NON-TRANSITORY COMPUTER-READABLE RECORDING MEDIUM ENCODED WITH TUNNEL CONNECTION ASSISTANCE PROGRAM

(71) Applicant: KONICA MINOLTA, INC., Tokyo (JP)

(72) Inventor: Shunsuke Nagae, Amagasaki (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/929,468

(22) Filed: Jul. 15, 2020

(65) Prior Publication Data
US 2021/0037150 A1 Feb. 4, 2021

(30) Foreign Application Priority Data
Jul. 31, 2019 (JP) .............................. JP2019-141217

(51) Int. Cl.
*H04N 1/00* (2006.01)
*H04L 12/24* (2006.01)
(Continued)

(52) U.S. Cl.
CPC ....... *H04N 1/00344* (2013.01); *G06F 3/1236* (2013.01); *G06F 3/1288* (2013.01);
(Continued)

(58) Field of Classification Search
CPC . G06F 3/00; G06F 3/12; G06F 3/1236; G06F 3/1288; H04L 41/00;
(Continued)

(56) References Cited

U.S. PATENT DOCUMENTS 9,712,492 B1\* 7/2017 Kim .................... H04L 63/0272
10,038,696 B1\* 7/2018 Marcovecchio ........ H04L 63/10
(Continued)

FOREIGN PATENT DOCUMENTS

JP 2002183106 A 6/2002

*Primary Examiner* — Boris D Grijalva Lobos
(74) *Attorney, Agent, or Firm* — Holtz, Holtz & Volek PC

(57) ABSTRACT

An assistance server assists an information processing system, wherein the information processing system includes a management server arranged outside of a firewall and a control subject device arranged inside of the firewall, the assistance server includes a hardware processor, and the hardware processor is configured to establish an assistance connection for communication with the control subject device in response to a request from the control subject device, in the case where being requested by the service provision server to control the control subject device, request the management server to control the control subject device on behalf of the service provision server, and in the case where being requested by the service provision server to control the control subject device, control the control subject device via the assistance connection and cause the control subject device to establish a continuous connection for communication with the management server.

17 Claims, 11 Drawing Sheets

(51) Int. Cl.
*H04L 29/12* (2006.01)
*H04L 29/06* (2006.01)
*H04L 41/0816* (2022.01)
*H04L 61/2514* (2022.01)
*H04L 61/2592* (2022.01)
*G06F 3/12* (2006.01)
*H04L 61/256* (2022.01)

(52) U.S. Cl.
CPC ........ *H04L 41/0816* (2013.01); *H04L 61/256* (2013.01); *H04L 61/2514* (2013.01); *H04L 61/2592* (2013.01); *H04L 63/029* (2013.01); *H04N 1/00244* (2013.01); *H04N 2201/0094* (2013.01)

(58) Field of Classification Search
CPC ....... H04L 41/08–0816; H04L 61/2514; H04L 61/2592; H04L 63/00; H04L 63/02; H04L 63/029; H04N 1/00244; H04N 1/00344
See application file for complete search history.

(56) References Cited

U.S. PATENT DOCUMENTS

| | | | |
|---|---|---|---|
| 2009/0125627 A1* | 5/2009 | Ford | H04L 63/166 709/227 |
| 2016/0156484 A1* | 6/2016 | Matsuhara | H04L 67/145 709/227 |
| 2017/0223112 A1* | 8/2017 | Kouno | H04L 41/0803 |

* cited by examiner

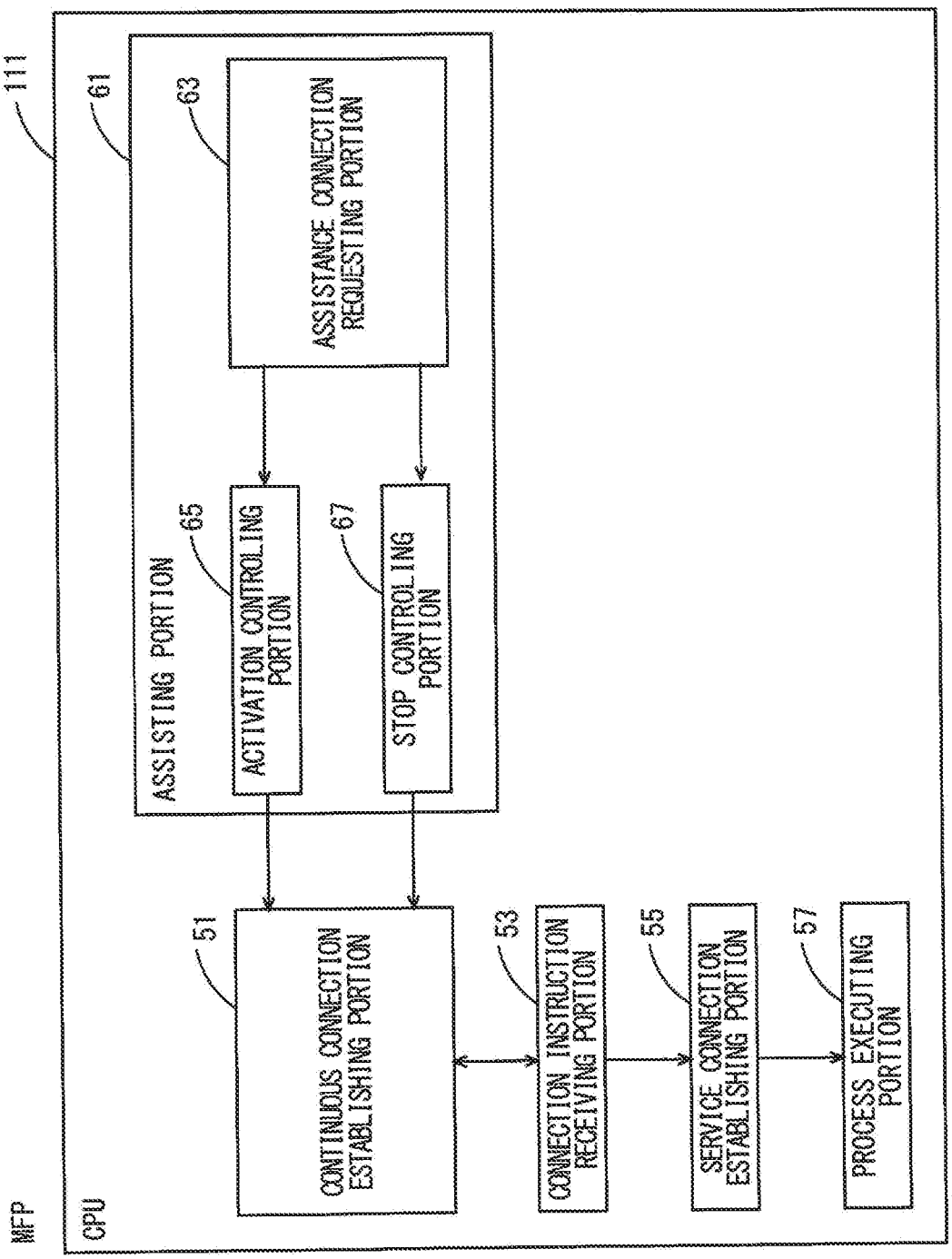
F I G. 7

F I G. 10
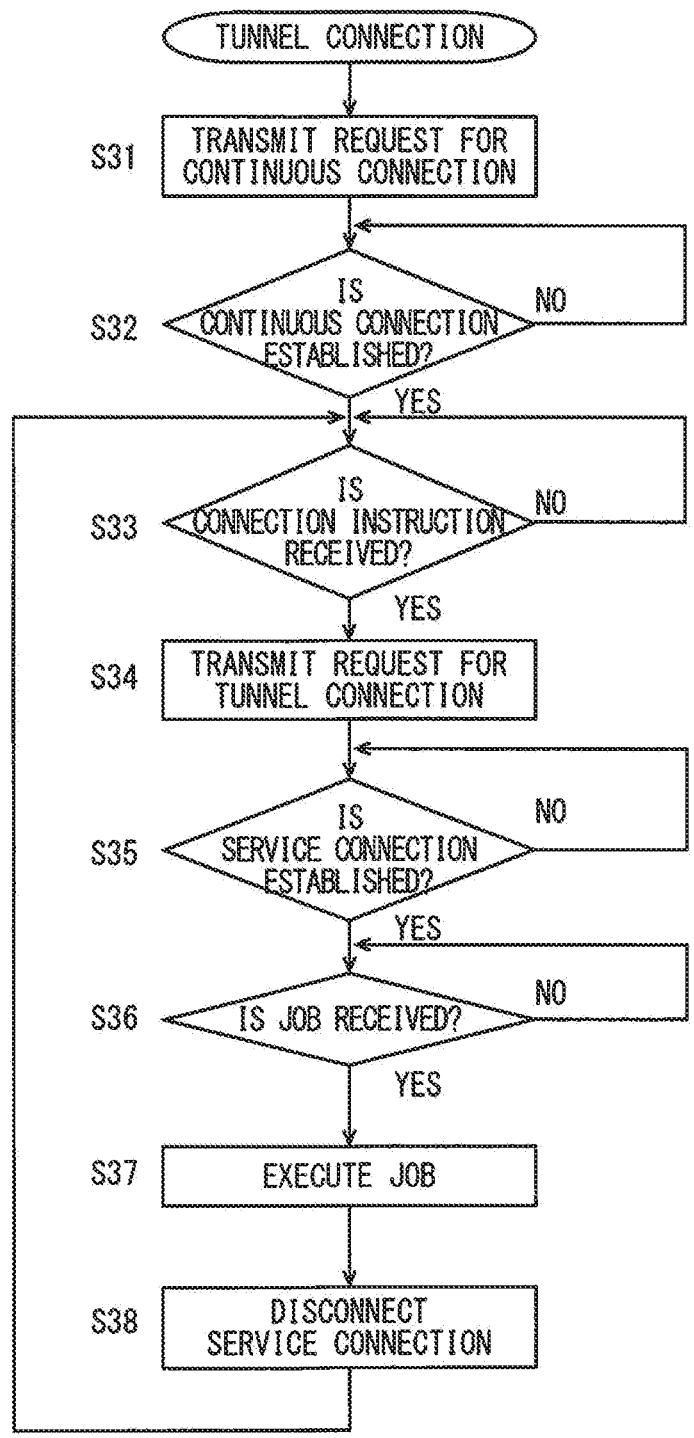

ASSISTANCE SERVER, TUNNEL CONNECTION ASSISTANCE METHOD AND NON-TRANSITORY COMPUTER-READABLE RECORDING MEDIUM ENCODED WITH TUNNEL CONNECTION ASSISTANCE PROGRAM

The entire disclosure of Japanese patent Application(s) No. 2019-141217 filed on Jul. 31, 2019, is incorporated herein by reference in its entirety.

BACKGROUND

Technological Field

The present invention relates to an assistance server, a tunnel connection assistance method and a non-transitory computer-readable medium encoded with a tunnel connection assistance program. In particular, the present invention relates to an assistance server that assists establishment of a tunnel connection for controlling a device inside of a firewall from outside, a tunnel connection assistance method performed in the assistance server and a non-transitory computer-readable medium encoded with a tunnel connection assistance program that causes the assistance server to perform the tunnel connection assistance method.

Description of the Related Art

A Multi Function Peripheral (hereinafter referred to as an "MFP") that is connected to a Local Area Network (hereinafter referred to as a "LAN") may be controlled using a service provided by a service provision server connected to the Internet. The communication between the service provision server and the MFP is carried out via a gateway that connects the Internet and the LAN to each other. This applies to the case where the data stored in a cloud server is printed by the MFP, for example. Because the LAN to which the MFP is connected is connected to the Internet via the firewall, the system in which a management server that establishes a continuous connection to the MFP is provided outside of the firewall and this management server mediates a tunnel connection between the service provision server and the MFP has been known. Specifically, the service provision server requests the management server to establish the tunnel connection to the MFP. The management server notifies the MFP in which a continuous connection is established of the request from the service provision server. Then, the MFP accesses the service provision server, whereby the tunnel connection between the MFP and the service provision server is established.

Meanwhile, when the number of MFPs that have continuous connections to the management server increases, a load applied to the management server increases. In order to solve this problem, it is necessary to increase processing capabilities of the management server. It is considered that another server is provided instead of improvement of processing capabilities of the management server. However, it may be desired that another service provided by the management service is kept. Thus, a reduction in load applied to the management server is required in order to keep the other service provided by the management server.

Japanese Patent Laid-Open No. 2002-183106 discloses a service switching system that is configured to accept requests from users and assign processes to a plurality of servers connected a network for load distribution in order to provide services to the large number of unspecified users via the network and is characterized in that a service switching control means for controlling a switch of services to be executed and changing a configuration of a group of servers that provides services while keeping existing services is provided.

While the service switching system described in Japanese Patent Laid-Open No. 2002-183106 can reduce a load applied to each server, there is a problem that a load applied to the server for provision of existing services cannot be reduced.

SUMMARY

According to one aspect of the present inventions, an assistance server that assists an information processing system, wherein the information processing system includes a management server arranged outside of a firewall and a control subject device arranged inside of the firewall, the management server establishes a continuous connection for communication with the control subject device in response to a request from the control subject device, and controls the control subject device via the continuous connection and causes the control subject device to access a service provision server in the case where being requested by the service provision server arranged outside of the firewall to control the control subject device, the assistance server includes a hardware processor, and the hardware processor is configured to establish an assistance connection for communication with the control subject device in response to a request from the control subject device, in the case where being requested by the service provision server to control the control subject device, request the management server to control the control subject device on behalf of the service provision server, and in the case where being requested by the service provision server to control the control subject device, control the control subject device via the assistance connection and cause the control subject device to establish the continuous connection.

According to another aspect of the present invention, a tunnel connection assistance method is performed by an assistance server that assists an information processing system, wherein the information processing system includes a management server arranged outside of a firewall and a control subject device arranged inside of the firewall, the management server establishes a continuous connection for communication with the control subject device in response to a request from the control subject device, and controls the control subject device via the continuous connection and causes the control subject device to access a service provision server in the case where being requested by the service provision server arranged outside of the firewall to control the control subject device, the tunnel connection assistance method causes the assistance server to perform an assistance connection establishing step of establishing an assistance connection to the control subject device in response to a request from the control subject device, a proxy requesting step of, in the case where being requested by the service provision server to control the control subject device, requesting the management server to control the control subject device on behalf of the service provision server, and an activating step of, in the case where being requested by the service provision server to control the control subject device, controlling the control subject device via the assistance connection and causing the control subject device to establish the continuous connection.

According to yet another aspect of the present invention, a non-transitory computer-readable recording medium is encoded with a tunnel connection assistance program executed by a computer that controls an assistance server that assists an information processing apparatus, wherein the information processing system includes a management server arranged outside of a firewall and a control subject device arranged inside of the firewall, the management server establishes a continuous connection for communication with the control subject device in response to a request from the control subject device, and controls the control subject device via the continuous connection and causes the control subject device to access a service provision server in the case where being requested by the service provision server arranged outside of the firewall to control the control subject device, the tunnel connection assistance program cause the computer to, establish an assistance connection to the control subject device in response to a request from the control subject device, in the case where being requested by the service provision server to control the control subject device, request the management server to control the control subject device on behalf of the service provision server, and in the case where being requested by the service provision server to control the control subject device, control the control subject device via the assistance connection and cause the control subject device to establish the continuous connection.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 7 is a diagram showing one example of the functions of a CPU included in the MFP;

FIG. 10 is a flowchart showing one example of a flow of a tunnel connection process.

DETAILED DESCRIPTION OF EMBODIMENTS

Figure 1:
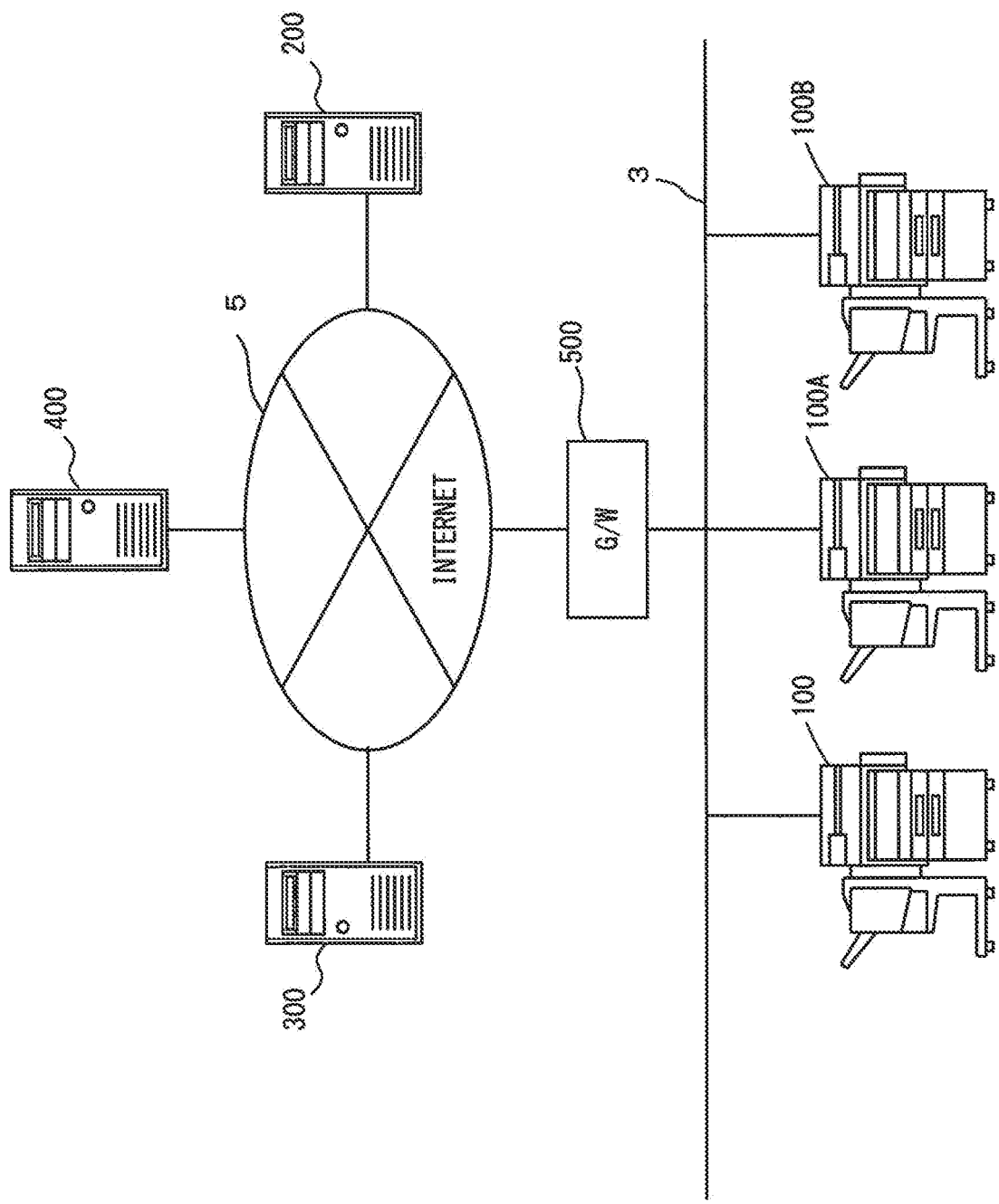
FIG. 1 is a diagram showing one example of the outline of an information processing system and an assistance server in one embodiment of the present invention.

Hereinafter, one or more embodiments of the present invention will be described with reference to the drawings. However, the scope of the invention is not limited to the disclosed embodiments.

In the following description, the same parts are denoted with the same reference characters. Their names and functions are also the same. Therefore, a detailed description thereof will not be repeated.

FIG. 1 is a diagram showing one example of the outline of an information processing system and an assistance server in one embodiment of the present invention. Referring to FIG. 1, the information processing system 1 includes MFPs (Multi Function Peripherals) 100, 100A, 100B that function as image processing apparatuses, a management server 300 that manages the MFPs 100, 100A, 100B, a service provision server 400 that provides services and a gateway (G/W) device 500. The services provided by the service provision server 400 include a service for controlling the MFPs 100, 100A, 100B to execute a process. Thus, the MFPs 100, 100A, 100B function as control subject devices that are to be controlled by the service provision server 400.

Each of the management server 300 and the service provision server 400 is a general computer. The management server 300, the service provision server 400 and the gateway device 500 are respectively connected to the Internet 5 and can communicate with one another via the Internet 5.

Further, an assistance server 200 is connected to the Internet 5. Thus, the assistance server 200, the management server 300, the service provision server 400 and the gateway device 500 can respectively communicate with one another via the Internet 5 and with another computer connected to the Internet. The assistance server 200 assists the information processing system 1.

The gateway device 500 is further connected to a Local Area Network (LAN) 3. The MFPs 100, 100A, 100B are respectively connected to the LAN 3. The gateway device 500 can communicate with the MFPs 100, 100A, 100B that are connected to the LAN 3. Further, the gateway device 500 and the MFPs 100, 100A, 100B can respectively communicate with another computer connected to the LAN 3.

The gateway device 500 has a firewall function and connects the LAN 3 inside of the firewall to the Internet 5 outside of the firewall. The gateway device 500 limits the access from a computer connected to the Internet 5 to the MFPs 100, 100A, 100B connected to the LAN 3. Thus, the access from the assistance server 200, the management server 300 and the service provision server 400 to the MFPs 100, 100A, 100B is limited. While not being limited in particular, the firewall function of the gateway device 500 is a packet-filtering firewall function of determining to permit or not to permit communication based on the address included in a packet. Further, the firewall function may be an application firewall function of substituting and controlling external communication in a protocol stack of an application layer.

Figure 2:
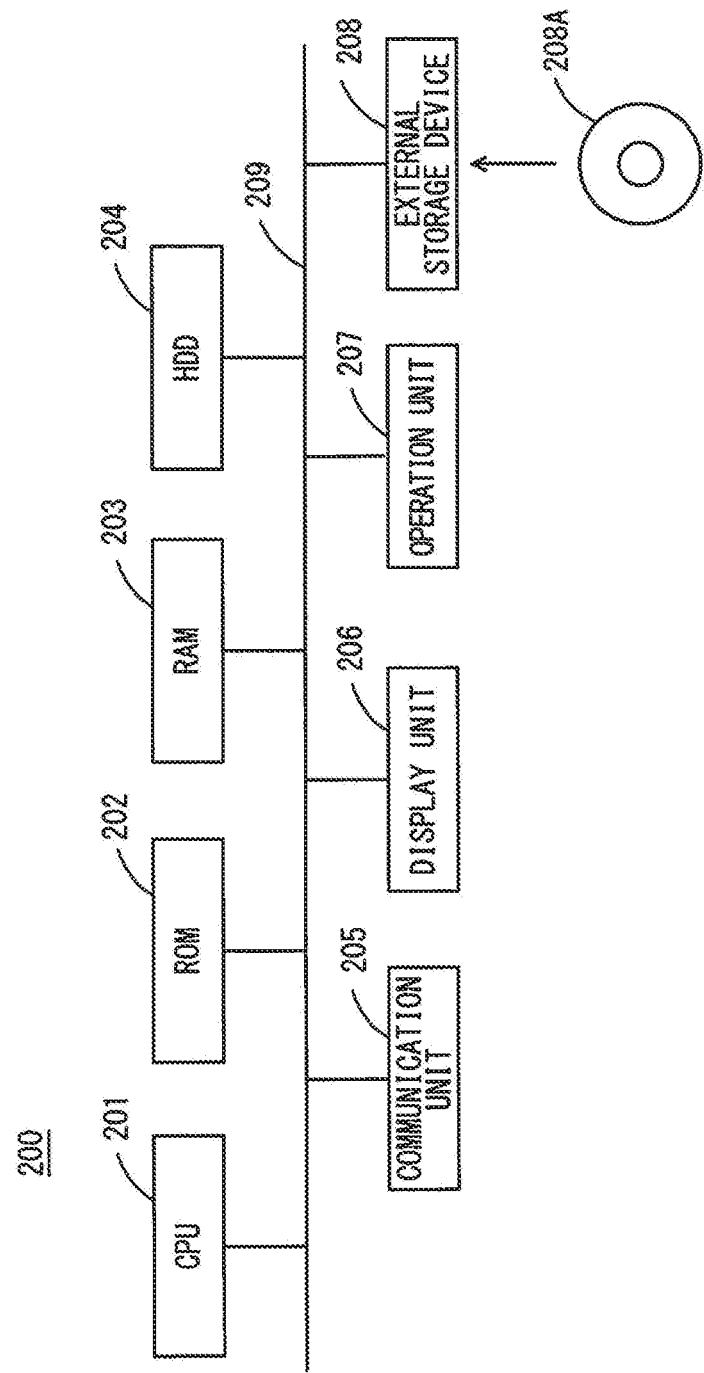
FIG. 2 is a block diagram showing one example of the outline of the hardware configuration of the assistance server in the present embodiment.

FIG. 2 is a block diagram showing one example of the outline of the hardware configuration of the assistance server in the present embodiment. Referring to FIG. 2, the assistance server 200 includes a CPU (Central Processing Unit) 201 for controlling the assistance server 200 as a whole, a ROM (Read Only Memory) 202 for storing a program to be executed by the CPU 201, a RAM (Random Access Memory) 203 that is used as a work area for the CPU 201, a HDD (Hard Disk Drive) 204 for storing data in a non-volatile manner, a communication unit 205 that connects the CPU 201 to the Internet 5, a display unit 206 that displays information, an operation unit 207 that accepts input by a user's operation and an external storage device 208. The CPU 201, the ROM 202, the RAM 203, the HDD 204, the communication unit 205, the display unit 206, the operation unit 207 and the external storage device 208 are respectively connected to a bus 209.

The external storage device 208 is mounted with a CD-ROM (Compact Disc ROM) 208A. The CPU 201 can access the CD-ROM 208A via the external storage device 208. The CPU 201 loads a program, recorded in the CD-ROM 208A which is mounted on the external storage device 208, into the RAM 203 for execution.

A medium for storing a program to be executed by the CPU 201 is not limited to the CD-ROM 208A but may be an optical disc (MO(Magnetic Optical Disc)/MD(Mini Disc)/DVD(Digital Versatile Disc)), an IC card, an optical card or a semiconductor memory such as a mask ROM or an EPROM (Erasable Programmable ROM).

Further, the program executed by the CPU 201 is not limited to a program recorded in the CD-ROM 208A, and the CPU 201 may load a program stored in the HDD 204 into RAM 203 for execution. In this case, another computer connected to the Internet 5 may rewrite the program stored in the HDD 204 of the assistance server 200, or may additionally write a new program therein. Further, the assistance server 200 may download a program from another computer connected to the Internet 5 and store the program in the HDD 204. The program referred to here includes not only a program directly executable by the CPU 201 but also a source program, a compressed program, an encrypted program and the like.

The hardware configuration and functions of the MFPs 100, 100A, 100B are the same. Therefore, the MFP 100 is described as an example here unless otherwise stated.

Figure 3:
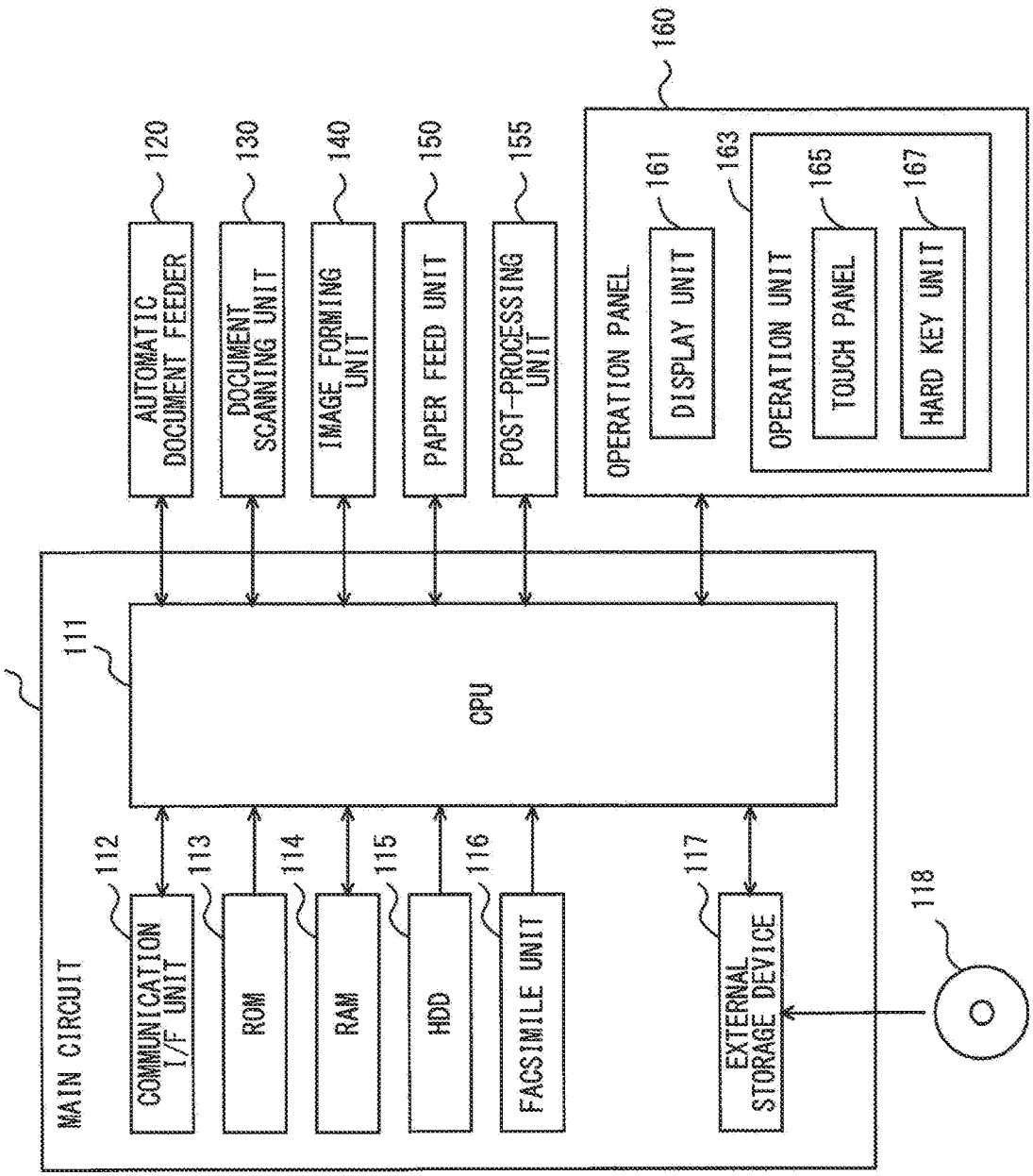
FIG. 3 is a block diagram showing one example of the outline of the hardware configuration of an MFP.

FIG. 3 is a block diagram showing one example of the outline of the hardware configuration of an MFP. Referring to FIG. 3, the MFP 100 includes a main circuit 110, a document scanning unit 130 for scanning a document, an automatic document feeder 120 for conveying a document to the document scanning unit 130, an image forming unit 140 for forming an image on a paper (a sheet of paper) or the like based on image data that is output by the document scanning unit 130 that has scanned a document, a paper feed unit 150 for supplying papers to the image forming unit 140, a post-processing unit 155 for processing a paper on which an image is formed and an operation panel 160 serving as a user interface.

The post-processing unit 155 performs a sorting process of sorting and discharging one or more papers on which images are formed by the image forming unit 140, a hole-punching process of punching the papers and a stapling process of stapling the papers.

The main circuit 110 includes a CPU 111, a communication interface (I/F) 112, a ROM 113, a RAM 114, a HDD 115 that is used as a mass storage device, a facsimile unit 116 and an external storage device 117 mounted with the CD-ROM 118. The CPU 111 is connected to the automatic document feeder 120, the document scanning unit 130, the image forming unit 140, the paper feed unit 150, the post-processing unit 155 and the operation panel 160 to control the MFP 100 as a whole.

The ROM 113 stores a program to be executed by the CPU 111 or data required for execution of the program. The RAM 114 is used as a work area when the CPU 111 executes the program. Further, the RAM 114 temporarily stores scanned data (image data) continuously transmitted from the document scanning unit 130.

The operation panel 160 is provided on an upper surface of the MFP 100, and includes the display unit 161 and the operation unit 163. The display unit 161 is a display device such as a Liquid Crystal Display (LCD) device or an organic ELD (Electro-Luminescence Display), and displays an instruction menu for the user, information about acquired image data and the like. The operation unit 163 includes a hard key unit 167 having a plurality of keys, and accepts input data such as each type of an instruction, characters, and numerals by the key operations of the user. The operation unit 163 further includes a touch panel 165 provided on the display unit 161.

The communication I/F unit 112 is an interface for connecting the MFP 100 to the LAN 3. The CPU 111 communicates with a device connected to the LAN 3 via the communication I/F unit 112, and transmits and receives data. Further, the communication I/F unit 112 can communicate with a computer connected to the Internet 5 such as the management server 300, the service provision server 400 and the assistance server 200 via the gateway device 500.

The facsimile unit 116 is connected to the Public Switched Telephone Network (PSTN), transmits facsimile data to the PSTN or receives facsimile data from the PSTN. The facsimile unit 116 stores the received facsimile data in the HDD 115 or outputs the facsimile data to the image forming unit 140. The image forming unit 140 prints the facsimile data received by the facsimile unit 116 on a paper. Further, the facsimile unit 116 converts the data stored in the HDD 115 into facsimile data and transmits the converted facsimile data to a facsimile machine connected to the PSTN.

The external storage device 117 is mounted with the CD-ROM 118. The CPU 111 can access the CD-ROM 118 via the external storage device 117. The CPU 111 loads the program recorded in the CD-ROM 118, which is mounted on the external storage device 117, into the RAM 114 for execution. A medium for storing a program to be executed by the CPU 111 is not limited to the CD-ROM 118 but may be an optical disc (MO/MD/DVD), an IC card, an optical card or a semiconductor memory such as a mask ROM, an EPROM or an EEPROM.

Further, the CPU 111 may load the program stored in the HDD 115 into the RAM 114 for execution. In this case, another computer connected to the LAN 3 or the Internet 5 may rewrite a program stored in the HDD 115 of the MFP 100 or may additionally write a new program therein. Further, the MFP 100 may download a program from another computer connected to the LAN 3 or the Internet 5 and store the program in the HDD 115. The program referred to here includes not only a program directly executable by the CPU 111 but also a source program, a compressed program, an encrypted program and the like.

In the information processing system 1 in the present embodiment, the service provision server 400 connected to the Internet 5 outside of the firewall can control any one of the MFPs 100, 100A, 100B connected to the LAN 3 inside of the firewall. The service provision server 400 is accessed from a personal computer (hereinafter referred to as a "PC") connected to the LAN 3 inside of the firewall and executes a process of providing a service according to an instruction provided by a user who operates the PC. Further, the service provision server 400 is accessed from a PC connected to the Internet 5 outside of the firewall, and executes a process of providing a service according to the instruction provided by a user who operates the PC.

Here, the service provision server 400 provides a service for causing the MFP 100 to execute a print job by way of example. The MFP 100 establishes a tunnel connection between the service provision server 400 and the MFP 100 such that the print job transmitted by the service provision server 400 passes through the firewall of the gateway device 500. In the information processing system 1, the management server 300 mediates between the service provision server 400 and the MFP 100.

Here, the procedure for establishing a tunnel connection in the information processing system 1 will be described. In the information processing system 1, a tunnel connection program that defines a process of communicating with the management server 300 and establishing a tunnel connection to the management server 300 is installed in each of the MFPs 100, 100A, 100B. This tunnel connection program is executed at a point in time at which each of the MFPs 100, 100A, 100B is activated. For example, in the MFP 100, the CPU 111 executes the tunnel connection program at a point in time at which the MFP 100 is powered on, and a task of executing the tunnel connection program by the CPU 111 resides in the CPU 111.

Figure 4:
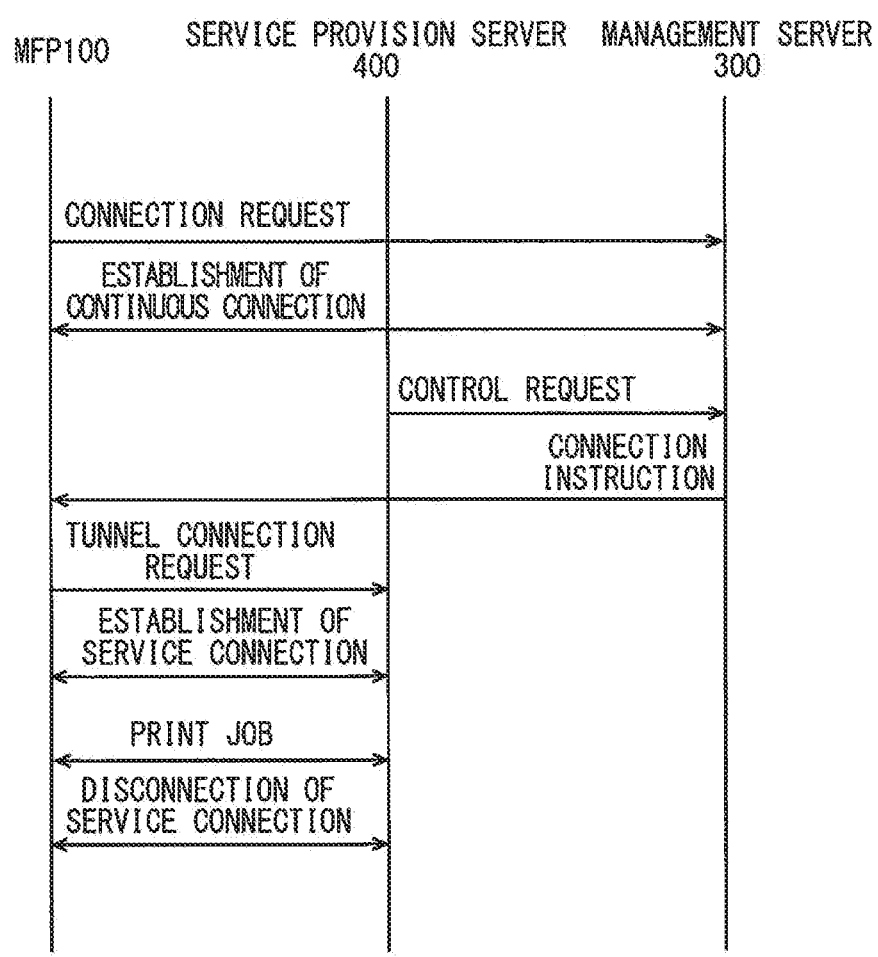
FIG. 4 is a diagram showing one example of the procedure for establishing a tunnel connection in the information processing system.

FIG. 4 is a diagram showing one example of the procedure for establishing a tunnel connection in the information processing system. Referring to FIG. 4, the MFP 100 stores a network address of the management server 300 in advance and requests a connection for communicating with the management server 300 using the network address. In response to being requested by the MFP 100 to provide a connection, the management server 300 establishes a continuous connection to communicate with the MFP 100. The continuous connection is a communication session for communication between the MFP 100 and the management server 300. The MFP 100 is inside of the firewall and the management server 300 is outside of the firewall. Thus, the continuous connection is a communication session that passes through the firewall. In each of the MFPs 100A, 100B other than the MFP 100, a continuous connection to the management server 300 is also established. Therefore, the management server 300 can communicate with each of the MFPs 100, 100A, 100B via each established continuous connection.

Next, the service provision server 400 requests the management server 300 to control a control subject device. The service provision server 400 notifies the management server 300 of the address information of the control subject device and the address information of the service provision server 400 together with this request. The address information of the control subject device is determined by selection of the control subject device by a user who operates the service provision server 400. Here, because the control subject device is the MFP 100, the user selects the MFP 100. Because having established a continuous connection with each of the MFPs 100, 100A, 100B, the management server 300 has received the address information of each of the MFPs 100, 100A, 100B. If acquiring the address information of each of the MFPs 100, 100A, 100B from the management server 300, the service provision server 400 can cause the user to select a control subject device from among the MFPs 100, 100A, 100B.

The address information of the service provision server 400 includes the network address of the service provision server 400 and a job ID of a job to be executed by the service provision server 400. The job is a task of executing an application program by the service provision server 400. Here, the address information of the service provision server 400 is a URL (Uniform Resource Locator) with which the MFP 100 accesses the service provision server 400. A URL such as "https://www.example.com/print_service?job_id=j00123:60001" includes a network address (domain name) of the service provision server 400, an identifier of a webpage, an identifier of a job (a job ID) to be executed by the service provision server 400, a port number of a listen port and the like. An unused port among ports in a predetermined range is used as a listen port. Further, a unique ID is issued as a job ID. The job to be executed by the service provision server 400 is a job corresponding to the service designated by the user who operates the service provision server 400 among the services provided by the service provision server 400.

In the case where being requested by the service provision server 400 to control a control subject device, the management server 300 specifies the MFP 100 based on the address information of the control subject device provided together with the request, and instructs the MFP 100 via the continuous connection to connect to the service provision server 400. As well as being instructed, the MFP 100 is notified of the address information of the service provision server 400 provided with the request made by the service provision server 400.

When being instructed by the management server 300 to connect to the service provision server 400, the MFP 100 requests the service provision server 400 to establish a tunnel connection based on the address information of the service provision server 400. The service provision server 400 establishes a service connection to the MFP 100 in response to being requested by the MFP 100 to establish a tunnel connection. The service connection is a communication session for communication between the MFP 100 and the service provision server 400. The MFP 100 is inside of the firewall, and the service provision server 400 is outside of the firewall. Therefore, the service connection is a communication session that passes through the firewall.

As described above, the URL that is the address information of the service provision server 400 includes the job ID. Therefore, the service provision server 400 that is requested by the MFP 100 to establish a tunnel connection can associate the control subject device with the job specified by the job ID. In other words, the job of executing the process corresponding to the service designated by the user who operates the service provision server 400 can be associated with the MFP 100 that is the control subject device. The service provision server 400 provides the service by executing the job. Here, because the process corresponding to the service is a process of causing the control subject device to execute the print job, the service provision server 400 transmits the print job to the MFP 100 that is the control subject device via the service connection.

When receiving the print job from the service provision server 400 via the service connection, the MFP 100 executes the print job. When execution of the print job is completed, the MFP 100 disconnects the service connection. The service provision server 400 may disconnect the service connection.

Next, the procedure for establishing a tunnel connection in the case where the assistance server 200 assists the information processing system 1 will be described. The assistance server 200 assists establishment of a service connection in the information processing system 1. In the case where the information processing system 1 is assisted by the assistance server 200, the service provision server 400 is set to transmit the request for controlling a control subject device not to the management server 300 but to the assistance server 200. Further, in each of the MFPs 100, 100A, 100B, a device assistance program for communication with the assistance server 200 is installed. Then, in each of the MFPs 100, 100A, 100B, it is set that the device assistance program is to be executed at the time of activation but the tunnel connection program is not to be executed at the time of activation. Thus, although executing the device assistance program at the time of activation, the CPU 111 does not execute the tunnel connection program at the time of activation in the MFP 100, for example. Thus, although a task of executing the device assistance program by the CPU 111 resides at the time of activation of the CPU 111, a task of executing the tunnel connection program does not reside at the time of activation of the CPU 111.

Figure 5:
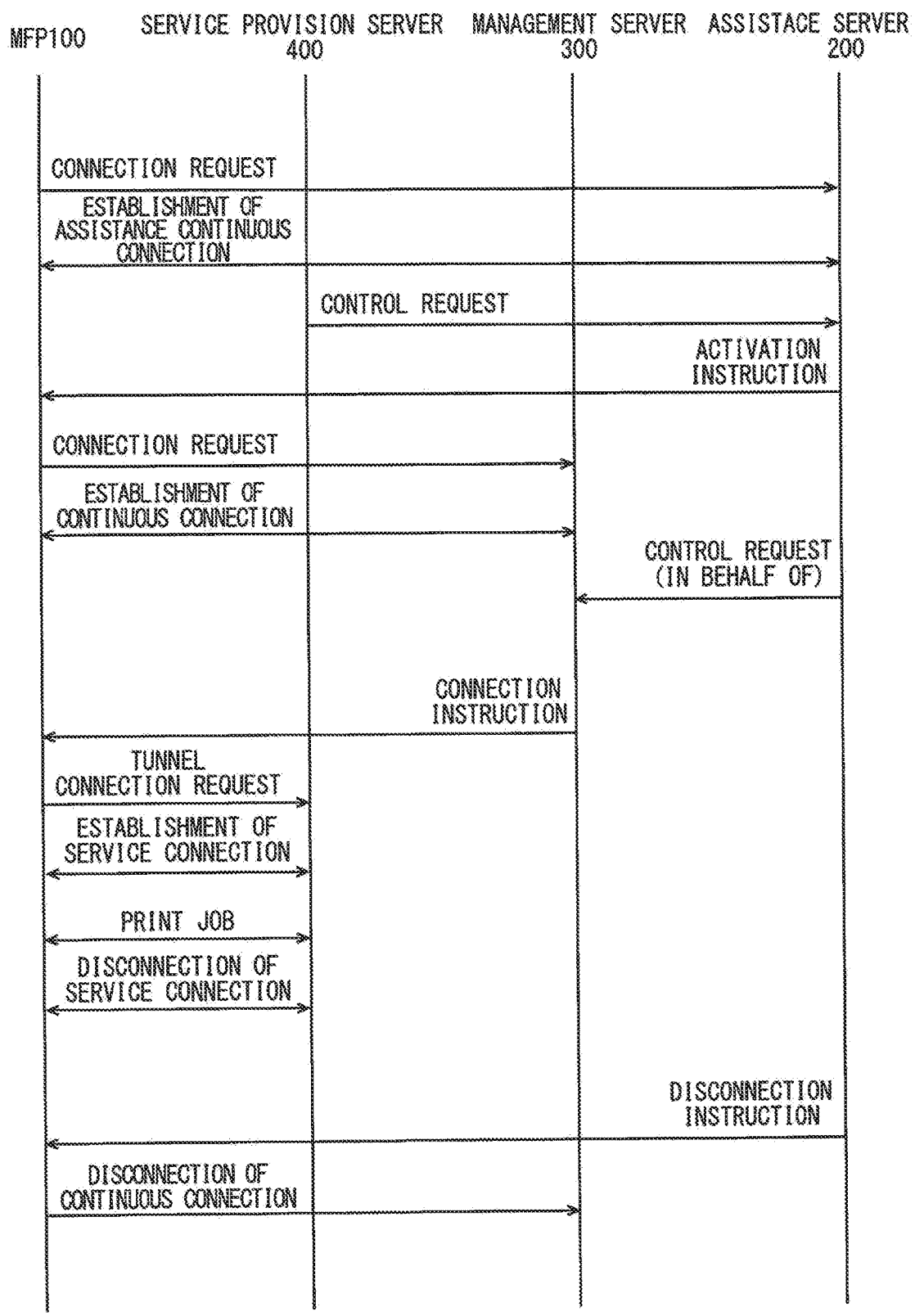
FIG. 5 is a diagram showing one example of the procedure for establishing a tunnel connection in the information processing system assisted by the assistance server.

FIG. 5 is a diagram showing one example of the procedure for establishing a tunnel connection in the information processing system assisted by the assistance server. Referring to FIG. 5, the MFP 100 stores the network address of the assistance server 200 in advance, and requests the assistance server 200 to establish a connection using the network address for communication between the MFP 100 and the assistance server 200. The assistance server 200 establishes an assistance connection for communicating with the MFP 100 in response to being requested by the MFP 100 to establish a connection. The assistance connection is a communication session for communication between the MFP 100 and the assistance server 200. The MFP 100 is inside of the firewall and the assistance server 200 is outside of the firewall. Therefore, the assistance connection is a communication session that passes through the firewall. An assistance connection to the assistance server 200 is also established in each of the MFPs 100A, 100B other than MFP 100. Therefore, the assistance server 200 can communicate with each of the MFPs 100, 100A, 100B.

In the above-mentioned information processing system 1, the continuous connection to the management server 300 is established at a point in time at which each of the MFPs 100, 100A, 100B is activated. In the case where the information processing system 1 is assisted by the assistance server 200, a continuous connection is not established but an assistance connection to the assistance server 200 is established at a point in time at which each of the MFPs 100, 100A, 100B is activated.

Next, the service provision server 400 requests the assistance server 200 to control a control subject device. The assistance server 200 is notified of the address information of the control subject device and the address information of the service provision server 400 by the service provision server 400 together with this request. While requesting the management server 300 to control a control subject device in the above-mentioned information processing system 1, the service provision server 400 requests not the management server 300 but the assistance server 200 to control the control subject device in the case where being assisted by the assistance server 200. Because having established an assistance connection to each of the MFPs 100, 100A, 100B, the assistance server 200 has received the address information of each of the MFPs 100, 100A, 100B. If acquiring the address information of each of the MFPs 100, 100A, 100B from the assistance server 200, the service provision server 400 can cause the user who operates the service provision server 400 to select the control subject device from among the MFPs 100, 100A, 100B.

In the case where being requested by the service provision server 400 to control the control subject device, the assistance server 200 specifies the MFP 100 based on the address information of the control subject device that is provided together with the request. The assistance server 200 instructs the MFP 100 via the assistance connection to activate a task of establishing a continuous connection.

When being instructed to activate the task of establishing the continuous connection, the MFP 100 executes the tunnel connection program. When the CPU 111 included in the MFP 100 executes the tunnel connection program, a task of executing the tunnel connection program by the CPU 111 is activate. The operation performed by the MFP 100 in the case where the CPU 111 executes the tunnel connection program is similar to the operation performed by the MFP 100 in the case where the information processing system 1 is not assisted by the assistance server 200. That is, the MFP 100 requests the management server 300 to establish a connection. The management server 300 establishes a continuous connection to the MFP 100 in response to being requested by the MFP 100.

Further, in the case where being requested by the service provision server 400 to control a control subject device, the assistance server 200 requests the management server 300 to control a control subject device on behalf of the service provision server 400. In the case where being requested by the assistance server 200 to control the control subject device, the management server 300 behaves similarly to the case where being requested by the service provision server 400 to control the control subject device. Specifically, the management server 300 specifies the MFP 100 based on the address information of the control subject device that is provided together with the request, and instructs the MFP 100 via the continuous connection to connect to the service provision server 400. Notification of the address information of the service provision server 400 that is provided from the service provision server 400 is made together with this instruction.

The operation performed by the MFP 100 in the case where the MFP 100 is instructed by the management server 300 to connect to the service provision server 400 is similar to the case where the information processing system 1 is not assisted by the assistance server 200. That is, the MFP 100 requests the service provision server 400 to establish a tunnel connection based on the address information of the service provision server 400. The service provision server 400 establishes a service connection to the MFP 100 in response to being requested by the MFP 100 to establish the tunnel connection.

Then, the service provision server 400 transmits a print job to the MFP 100 that is the control subject device via the service connection. When receiving the print job from the service provision server 400, the MFP 100 executes the print job. When execution of the print job is completed, the MFP 100 disconnects the service connection.

Further, the assistance server 200 instructs the MFP 100 that is the control subject device to disconnect the continuous connection upon satisfaction of a predetermined condition. In response, the MFP 100 disconnects the continuous connection.

In the case where the information processing system 1 is assisted by the assistance server 200, a continuous connection is not always established between the management server 300 and each of the MFPs 100, 100A, 100B. Specifically, in the case where a control subject device is selected by the user who operates the service provision server 400, a continuous connection is established between the control subject device and the management server 300. Therefore, in the case where the information processing system 1 is assisted by the assistance server 200, a load applied to the management server 300 is reduced.

Figure 6:
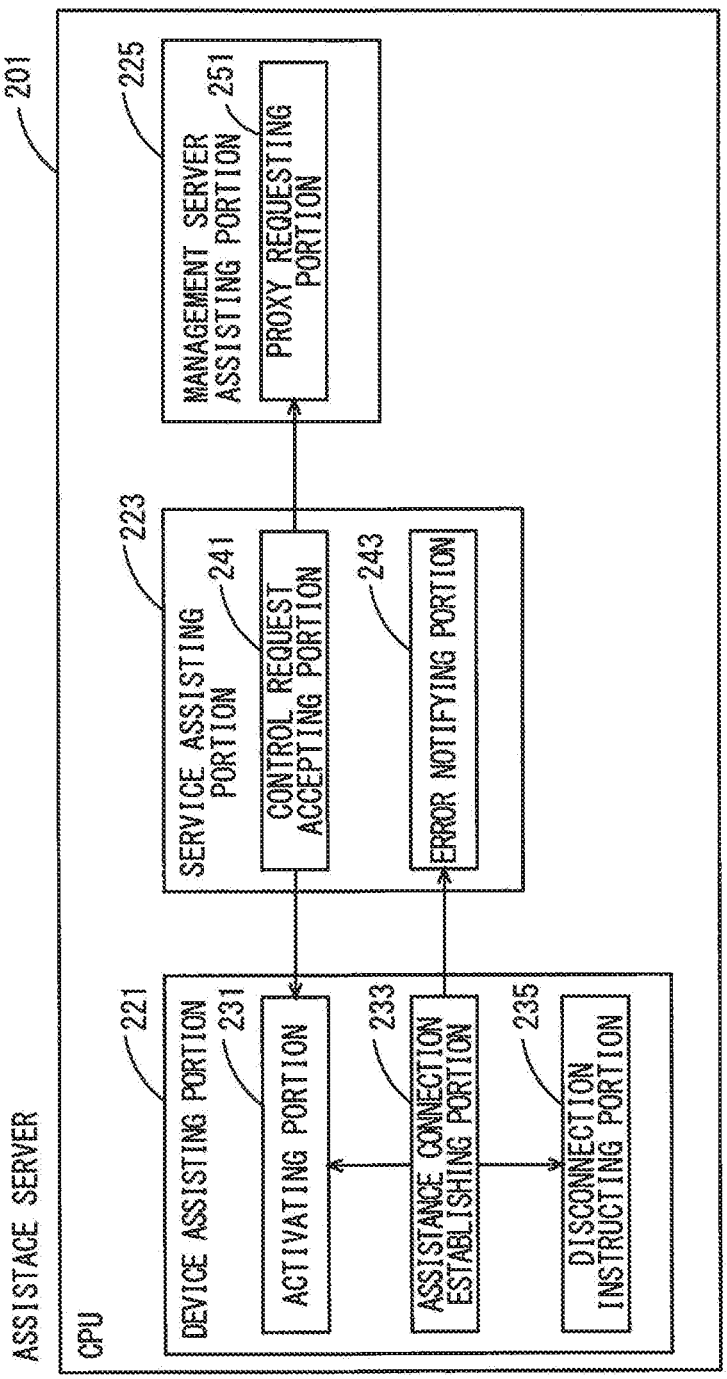
FIG. 6 is a block diagram showing one example of the functions of a CPU included in the assistance server.

FIG. 6 is a block diagram showing one example of the functions of the CPU included in the assistance server. The functions shown in FIG. 6 are the functions implemented by the CPU 201 in the case where the CPU 201 included in the assistance server 200 executes a tunnel connection assistance program stored in the ROM 202, the HDD 204 and the CD-ROM 208A. Referring to FIG. 6, the CPU 201 included in the assistance server 200 includes a device assisting portion 221, a service assisting portion 223 and a management server assisting portion 225.

The device assisting portion 221 assists the MFPs 100, 100A, 100B. The device assisting portion 221 includes an activating portion 231, an assistance connection establishing portion 233 and a disconnection instructing portion 235. The service assisting portion 223 assists the service provision server 400. The service assisting portion 223 includes a control request accepting portion 241 and an error notifying portion 243. The management server assisting portion 225 assists the management server 300. The management server assisting portion 225 includes a proxy requesting portion 251.

In response to being requested to establish a connection from any one of the MFPs 100, 100A, 100B, the assistance connection establishing portion 233 establishes an assistance connection with each of the MFPs 100, 100A, 100B. Specifically, when the communication unit 205 receives a signal for requesting establishment of an assistance connection from any one of the MFPs 100, 100A, 100B, the assistance connection is established. The assistance connection establishing portion 233 outputs an assistance connection ID for identifying an assistance connection to the activating portion 231 and the disconnection instructing portion 235.

The control request accepting portion 241 receives control request information representing the request for control of a control subject device made by the service provision server 400. Specifically, the control request accepting portion 241 controls the communication unit 205 and receives the control request information transmitted by the service provision server 400. The control request information includes the address information of the control subject device and the address information of the service provision server 400. The control request accepting portion 241 outputs the control request information to the activating portion 231 and the proxy requesting portion 251.

In response to receiving the control request information from the control request accepting portion 241, the activating portion 231 specifies the MFP 100 based on the address information of the control subject device included in the control request information. The activating portion 231 transmits an activation instruction to the MFP 100 via the assistance connection. The activation instruction is a command to provide an instruction for executing the tunnel connection program. The MFP 100 that receives the activation instruction executes the tunnel connection program. Thus, because the MFP 100 requests the management server 300 to establish a continuous connection, the continuous connection is established between the MFP 100 and the management server 300.

After the activating portion 231 transmits the activation instruction, a continuous connection may not be established between the MFP 100 and the management server 300. The MFP 100 returns an error signal in the case where a continuous connection is not established. In the case where the communication unit 205 receives the error signal from the MFP 100, the activating portion 231 outputs a notification instruction to the error notifying portion 243.

In response to being input the notification instruction from the activating portion 231, the error notifying portion 243 notifies the service provision server 400 of an error. Specifically, the error notifying portion 243 transmits error information representing that the control subject device cannot be controlled. Thus, the user who operates the service provision server 400 can be notified that the control subject device cannot be controlled.

In response to being input the control request information from the control request accepting portion 241, the proxy requesting portion 251 transmits the control request information to the management server 300 on behalf of the service provision server 400. In the case where receiving the control request information from the assistance server 200, the management server 300 behaves similarly to the case where receiving the control request information from the service provision server 400. Specifically, the management server 300 specifies the MFP 100 based on the address information of the control subject device included in the control request information and transmits a connection instruction to the MFP 100 via the continuous connection. The connection instruction is a command to provide an instruction for accessing the service provision server 400. The connection instruction includes the address information of the service provision server 400 included in the control request information. When receiving the connection instruction from the management server 300, the MFP 100 requests the service provision server 400 to establish a tunnel connection based on the address information of the service provision server 400. In response to being requested by the MFP 100 to establish a tunnel connection, the service provision server 400 establishes a service connection to communicate with the MFP 100.

In the case where a disconnection condition is satisfied, the disconnection instructing portion 235 transmits a disconnection instruction to the device that satisfies the disconnection condition via an assistance connection. The disconnection instruction is a command to provide an instruction for disconnecting a continuous connection. For example, the disconnection instruction is transmitted to the MFP 100 in the case where the disconnection condition is satisfied in the MFP 100. In the case where receiving the disconnection instruction, the MFP 100 disconnects an established connection to the management server 300. Specifically, in the case where receiving the disconnection instruction, the MFP 100 ends a task of executing the tunnel connection program by the CPU 111 included in the MFP 100.

The disconnection condition is that a predetermined period of time elapses since an activation instruction is transmitted to a control subject device. In the case where the assistance server 200 acquires the details of a job from the service provision server 400, the disconnection instructing portion 235 can determine the predetermined period of time. For example, the predetermined period of time is determined based on the type of a job, which the control subject device receives from the service provision server 400. For example, in the case where the job is a print job, the disconnection instructing portion 235 calculates a period of time during which the job is executed as the predetermined period of time based on the number of papers to be printed. Further, in the case where the job is image processing, the disconnection instructing portion 235 calculates the predetermined period of time based on the size of data used for image processing and the details of image processing. The image processing is an edge enhancement processing of enhancing the edge of an image, character recognition processing of recognizing a character in an image and the like. Further, the disconnection condition may be that a predetermined period of time elapses since a service connection is disconnected.

Activation instructions might be transmitted to a plurality of MFPs among the MFPs 100, 100A, 100B, and continuous connections might be established in the plurality of MFPs. In the case where the number of devices in which continuous connections are established is equal to or larger than a predetermined number, the disconnection condition may be that the date and time when a device receives the activation instruction is the earliest among the devices. Further, in the case where the number of devices in which continuous connections are established is equal to or larger than the predetermined number, the disconnection condition may be that the number of times a device has received activation instructions in the past is the smallest among the devices.

FIG. 7 is a diagram showing one example of the functions of the CPU included in the MFP. The functions shown in FIG. 7 are the functions implemented by the CPU 111 in the case where the CPU 111 included in the MFP 100 executes the tunnel connection program and the device assistance program. Referring to FIG. 7, the CPU 111 included in the MFP 100 includes a continuous connection establishing portion 51, a connection instruction receiving portion 53, a service connection establishing portion 55, a process executing portion 57 and an assisting portion 61.

The assisting portion 61 is a function implemented in the CPU 111 in the case where the CPU 111 executes the device assistance program. Therefore, the assisting portion 61 is the function implemented by the CPU 111 at the time of activation of the MFP 100. The assisting portion 61 includes an assistance connection requesting portion 63, an activation controlling portion 65 and a stop controlling portion 67.

The assistance connection requesting portion 63 requests the assistance server 200 to establish an assistance connection using the network address of the assistance server 200 stored in the HDD 115, and establishes the assistance connection to the assistance server 200. Specifically, the CPU 111 controls the communication I/F unit 112, transmits a signal for requesting the assistance server 200 to establish the assistance connection and establishes the assistance connection. When the assistance connection is established, the assistance connection requesting portion 63 outputs an assistance connection ID for identifying the assistance connection to the activation controlling portion 65 and the stop controlling portion 67.

When controlling the communication I/F unit 112 and receiving an activation instruction from the assistance server 200 via the assistance connection, the activation controlling portion 65 causes the CPU 111 to execute the tunnel connection program.

Further, at a point in time at which a connection instruction is received from the assistance server 200, a device that is to be requested to establish a continuous connection might not be set in a predetermined area in the HDD 115. The device that is to be requested to establish a continuous connection is defined by the tunnel connection program. Specifically, the device that is to be requested to establish a continuous connection is set in the area in the HDD 115 defined by the tunnel connection program. In the CPU 111, the task of executing the tunnel connection program accesses the area in the HDD 115 defined by the tunnel connection program and acquires information as to which device is to be requested to establish a continuous connection.

In the case where the address of the management server 300 is not stored in the area in the HDD 115 defined by the tunnel connection program, the activation controlling portion 65 stores the address of the management server 300 in that area. The case where the address of the management server 300 is not stored in the area in the HDD 115 defined by the tunnel connection program includes the case where the address is not set in the area or the case where the address is set in the area but different from the address of the management server 300. The address of the management server 300 is stored in the HDD 115 in advance, and the activation controlling portion 65 compares the address of the management server 300 stored in the HDD 115 with the address stored in the area in the HDD 115 defined by the tunnel connection program. In the case where the address stored in the area in the HDD 115 defined by the tunnel connection program is the same as the address of the management server 300, the activation controlling portion 65 does not store the address of the management server 300 in the area in the HDD 115 defined by the tunnel connection program. Therefore, after the address of the management server 300 is stored in the area in the HDD 115 defined by the tunnel connection program, the activation controlling portion 65 can prevent an updating process from being executed again and cause the MFP 100 to establish a continuous connection early.

When the CPU 111 executes the tunnel connection program, the continuous connection establishing portion 51, the connection instruction receiving portion 53 and the service connection establishing portion 55 are implemented in the CPU 111.

The continuous connection establishing portion 51 acquires the address of the management server 300 stored in the area in the HDD 115 defined by the tunnel connection program. Then, the continuous connection establishing portion 51 requests the management server 300 to establish a continuous connection using the address of the management server 300 and establishes the continuous connection to the management server 300. Specifically, the CPU 111 controls the communication I/F unit 112, transmits a signal for requesting establishment of the continuous connection to the management server 300 and establishes the continuous connection to the management server 300. When the continuous connection is established, the continuous connection establishing portion 51 outputs a continuous connection ID for identification to the connection instruction receiving portion 53.

A continuous connection might not be established even in the case where the continuous connection establishing portion 51 requests the management server 300 to establish a continuous connection. A continuous connection might not be established due to a communication error, for example. The activation controlling portion 65 monitors a task of executing the tunnel connection program by the CPU 111 and determines whether a continuous connection is established. In the case where a continuous connection is not established, the activation controlling portion 65 transmits error information representing non-establishment of a continuous connection to the assistance server 200 via an assistance connection.

The connection instruction receiving portion 53 controls the communication I/F unit 112 and receives a connection instruction from the management server 300 via a continuous connection. Because the address information of the service provision server 400 is transmitted from the management server 300 together with the connection instruction, the connection instruction receiving portion 53 receives the address information of the service provision server 400. In response to receiving the connection instruction, the connection instruction receiving portion 53 outputs the address information of the service provision server 400 to the service connection establishing portion 55.

The service connection establishing portion 55 requests the service provision server 400 to establish a tunnel connection using the address information of the service provision server 400. Specifically, the service connection establishing portion 55 controls the communication I/F unit 112 and transmits a signal for requesting the start of communication to the address of the service provision server 400. Thus, a service connection is established between the MFP 100 and the service provision server 400.

When the service connection is established, the service provision server 400 controls the MFP 100 that is a control subject device. The process executing portion 57 executes a process according to the instruction received from the service provision server 400 via the service connection. For example, in the case where the service provision server 400 transmits a print job to the MFP 100 via the service connection, the process executing portion 57 executes the print job.

When the control of the MFP 100 by the service provision server 400 ends, the service connection establishing portion 55 disconnects the service connection. For example, in the case where executing a print job received from the service provision server 400, the process executing portion 57 returns a result of execution of the print job to the service provision server 400. After the result of execution of the print job is returned to the service provision server 400, the service connection establishing portion 55 disconnects the service connection.

In response to reception of a disconnection instruction by the communication I/F unit 112 from the assistance server 200 via an assistance connection, the stop controlling portion 67 disconnects the continuous connection established by the continuous connection establishing portion 51. Specifically, the CPU 111 ends the task of executing the tunnel connection program. Thus, the period of time during which the continuous connection to the MFP 100 is established in the management server 300 can be as short as possible.

Figure 8:
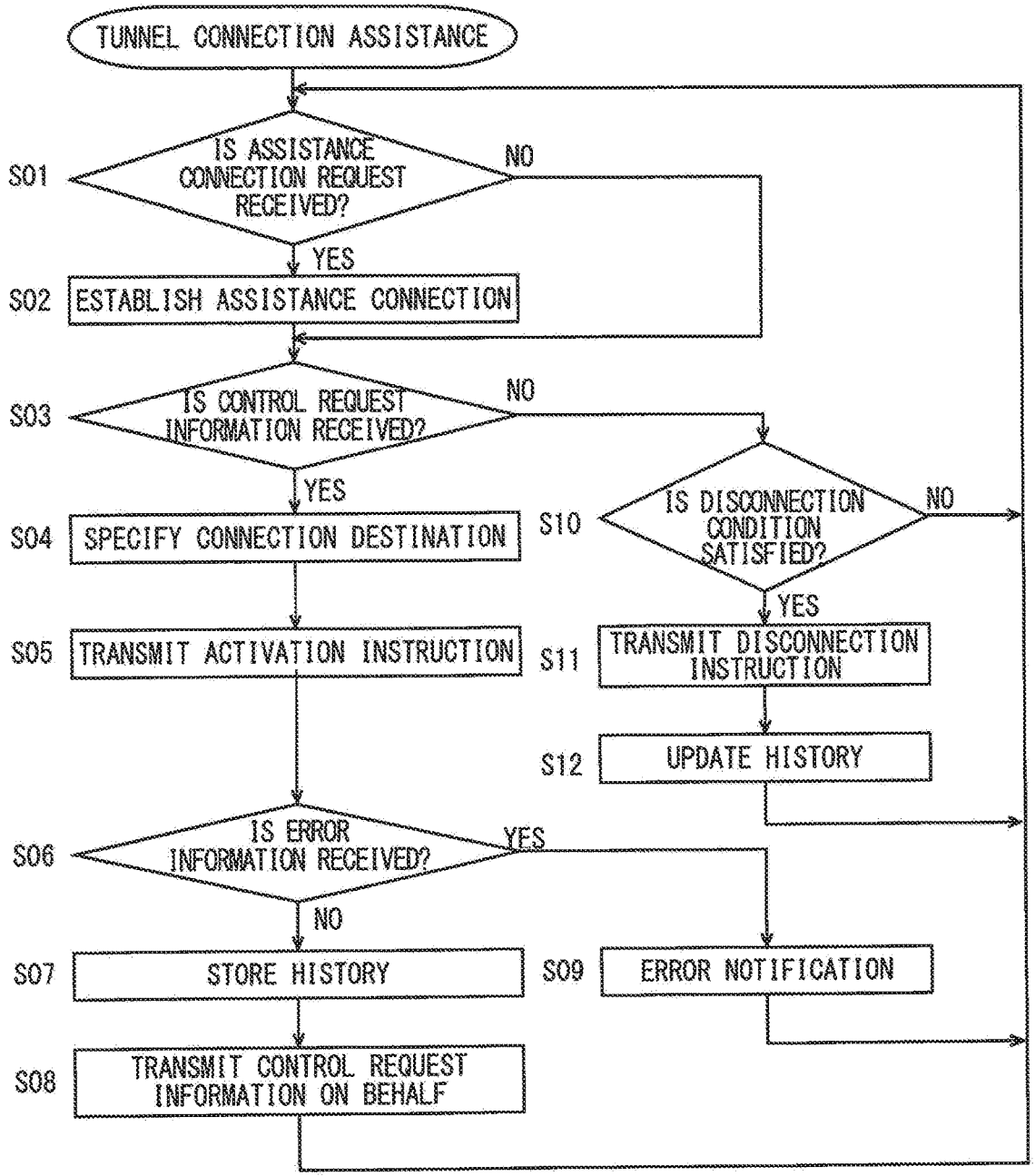
FIG. 8 is a flowchart showing one example of a flow of a tunnel connection assistance process.

FIG. 8 is a flowchart showing one example of a flow of a tunnel connection assistance process. The tunnel connection assistance process is a process executed by a CPU 201 in the case where the CPU 201 included in the assistance server 200 executes the tunnel connection assistance program stored in the ROM 202, the HDD 204 or the CD-ROM 208A. Referring to FIG. 8, the CPU 201 included in the assistance server 200 determines whether the communication unit 205 has received a signal for requesting establishment of an assistance connection from any one of the MFPs 100, 100A, 100B (step S01). If the signal for requesting establishment of an assistance connection is received, the process proceeds to the step S02. If not, the process proceeds to the step S03. In the step S02, the assistance connection to the device that has transmitted the signal for requesting establishment of an assistance connection is established. Because each of the MFPs 100, 100A, 100B transmits a signal for requesting establishment of an assistance connection when being activated, an assistance connection to each of the activated devices among the MFPs 100, 100A, 100B is established.

In the step S03, the CPU 201 determines whether the communication unit 205 has received control request information from the service provision server 400. The control request information is the information representing a request for controlling a control subject device made by the service provision server 400. If the control request information is received, the process proceeds to the step S04. If not, the process proceeds to the step S10. The control request information includes the address information of a control subject device and the address information of the service provision server 400.

In the step S04, a connection destination is specified, and the process proceeds to the step S05. The connection destination is the device to be controlled by the service provision server 400. The connection destination is specified based on the address information of a control subject device included in the control request information. In the step S05, an activation instruction is transmitted to the control subject device that is the connection destination, and the process proceeds to the step S06. The activation instruction is transmitted via the assistance connection to the control subject device that is the connection destination, the assistance connection being established in the step S01. The activation instruction is a command to provide an instruction for executing the tunnel connection program. In the step S06, the CPU 201 determines whether the communication unit 205 has received error information via the assistance connection. The error information is transmitted from a control subject device in the case where a continuous connection to the management server 300 is not established in the control subject device. If the error information is received, the process proceeds to the step S09. If not, the process proceeds to the step S07. In the step S09, the service provision server 400 is notified of an error, and the process returns to the step S01. Specifically, an error signal indicating that the control subject device cannot be controlled is transmitted to the service provision server 400. Thus, the user who operates the service provision server 400 can be notified that the control subject device cannot be controlled.

History is stored in the step S07, and the process proceeds to the step S08. The history indicates the period during which a tunnel connection is established in the control subject device. Specifically, the history includes a device ID for identifying a control subject device, the date and time at which a tunnel connection is started and the end date and time at which a tunnel connection ends. Here, the history piece in which a device ID of a control subject device is set, and the date and time at which an activation instruction is transmitted to the control subject device are set as the start date and time is produced and stored in the HDD 115.

In the step S08, the CPU 201 transmits the control request information to the management server 300 on behalf of the service provision server 400, and the process returns to the step S01. The control request information is the information received from the service provision server 400 in the step S03. Thus, in the case where receiving the control request information, the management server 300 behaves similarly to the case where receiving the control request information from the service provision server 400. Specifically, the management server 300 specifies the MFP 100 based on the address information of the control subject device included in the control request information and transmits a connection instruction to the MFP 100 via a continuous connection.

In the step S10, the CPU 201 determines whether a disconnection condition is satisfied. If the disconnection condition is satisfied, the process proceeds to the step S11. If not, the process returns to the step S01. In the case where the disconnection condition is that the elapsed period of time since establishment of a tunnel connection is equal to or larger than a predetermined period of time, the elapsed period of time from the start date and time of a history data piece in which the end date and time are not set is calculated with reference to the history stored in the HDD 115. The predetermined period of time is the period of time that is determined based on the type of a job received by a control subject device from the service provision server 400. For example, in the case where the job is a print job, the period of time during which the job is executed is determined as the predetermined period of time based on the number of papers to be printed. In the case where the job is image processing, the predetermined period of time is determined based on the size of data to be processed in the image processing and the details of the image processing.

Further, in the case where notification is made by the MFP 100 that a service connection is disconnected, the disconnection condition can be that the elapsed period of time since disconnection of the service connection is equal to or larger than a predetermined period of time. In this case, when the predetermined period of time elapses since notification is made that the service connection is disconnected from the MFP 100, it is determined that the disconnection condition is satisfied.

Further, in the case where the number of devices that have transmitted activation instructions is more than one, the disconnection condition may be satisfied for the device having the earliest date and time at which the activation instruction is transmitted. In this case, with reference to the history stored in the HDD 115, the CPU 201 determines that the disconnection condition is satisfied for the device having the earliest start date and time and no end date and time. Further, in the case where the number of devices having the established continuous connections is more than one, the disconnection condition may be satisfied for the device having the smallest number of times for establishment of a tunnel connection in the past. In this case, with reference to the history stored in the HDD 115, the CPU 201 determines that the disconnection condition is satisfied for the device having the smallest number of history data pieces having the set end date and time.

In the step S11, a disconnecting instruction is transmitted to the device that satisfies the disconnection condition, and the process proceeds to the step S12. The disconnection instruction is a command to provide an instruction for disconnecting a continuous connection. The device that receives the disconnection instruction disconnects the established continuous connection to the management server 300.

In the step S12, the history is updated, and the process returns to the step S01. The date and time at which the disconnection instruction is transmitted are set as the end date and time in the history data piece, that includes the device ID of the device that satisfies the disconnection condition, in the history stored in the HDD 115.

Figure 9:
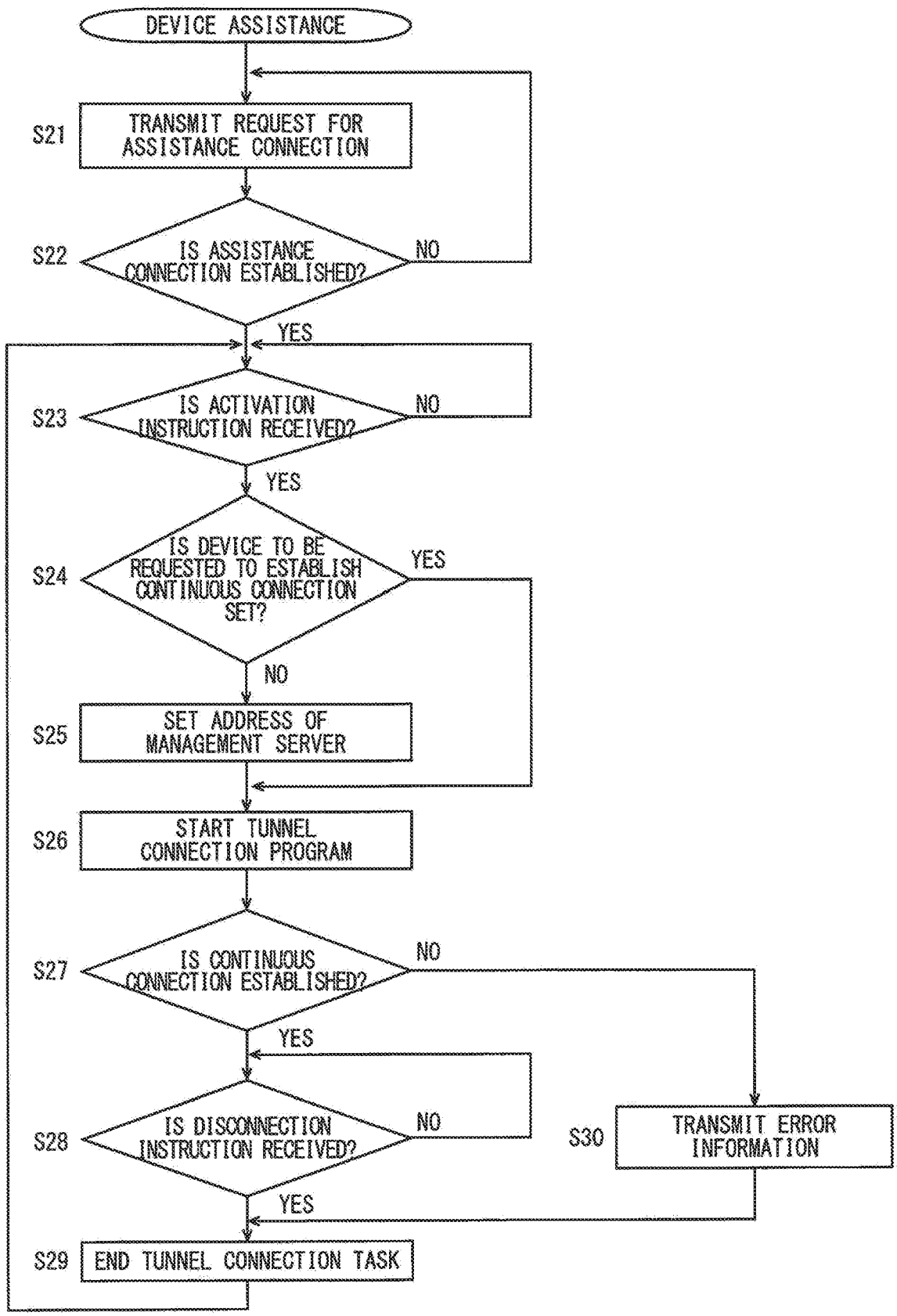
FIG. 9 is a flowchart showing one example of a flow of a device assistance process.

FIG. 9 is a flowchart showing one example of a flow of a device assistance process. The device assistance process is a process executed by the CPU 111 in the case where the CPU 111 included in the MFP 100 executes a device assistance program. Referring to FIG. 9, the CPU 111 included in the MFP 100 controls the communication I/F unit 112, transmits a signal for requesting establishment of an assistance connection to the assistance server 200 (step S21), and the process proceeds to the step S22. In the step S22, the CPU 111 determines whether an assistance connection to the assistance server 200 is established. The process waits until the assistance connection is established (NO in the step S22). If the assistance connection is established (YES in the step S22), the process proceeds to the step S23.

In the step S23, the CPU 111 determines whether the communication I/F unit 112 has received an activation instruction from the assistance server 200 via the assistance connection. The process waits until the activation instruction is received (NO in the step S23). If the activation instruction is received (YES in the step S23), the process proceeds to the step S24.

In the step S24, the CPU 111 determines whether the device to be requested to establish a continuous connection is set. The device to be requested to establish a continuous connection is defined by the tunnel connection program. If the device to be requested to establish a continuous connection is set, the process proceeds to the step S26. If the device to be requested to establish a continuous connection is not set, the process proceeds to the step S25. In the step S25, the address of the management server 300 is set as the device to be requested to establish a continuous connection, and the process proceeds to the step S26. In the case where the address of the management server 300 is set as the device to be requested to establish a continuous connection, the step S25 is not performed. Thus, the continuous connection can be established early.

In the step S26, the tunnel connection program is started, and the process proceeds to the step S27. While details of the process defined by the tunnel connection program will be described below, the CPU 111 requests the management server 300 to establish a continuous connection using the address of the management server 300 when the tunnel connection program is started. In the step S27, the CPU 111 determines whether the continuous connection to the management server 300 is established. If the continuous connection is established, the process proceeds to the step S28. If not, the process proceeds to the step S30.

In the step S28, the CPU 111 determines whether a disconnection instruction has been received from the assistance server 200 via an assistance connection. The process waits until a disconnection instruction is received (NO in the step S28). If the disconnection instruction is received (YES in the step S28), the process proceeds to the step S29. In the step S29, the CPU 111 ends the task of executing the tunnel connection program started in the step S26, and the process returns to the step S23.

On the other hand, in the step S30, error information representing non-establishment of a continuous connection is transmitted to the assistance server 200 via the assistance connection, and the process proceeds to the step S29. In the step S29, the CPU 111 ends the task of executing a tunnel connection program started in the step S26, and the process returns to the step S23.

FIG. 10 is a flowchart showing one example of a flow of a tunnel connection process. The tunnel connection process is a process executed by the CPU 111 in the case where the CPU 111 included in the MFP 100 executes the tunnel connection program. Referring to FIG. 10, the CPU 111 included in the MFP 100 transmits a signal for requesting establishment of a continuous connection to the management server 300 (step S31), and the process proceeds to the step S32. In the step S32, the CPU 111 determines whether the continuous connection is established. The process waits until the continuous connection is established (NO in the step S32). If the continuous connection is established (YES in the step S32), the process proceeds to the step S33.

In the step S33, the CPU 111 determines whether a connection instruction is received from the management server 300 via the continuous connection. The process waits until the connection instruction is received (NO in the step S33). If the connection instruction is received, the process proceeds to the step S34. Because the address information of the service provision server 400 is transmitted from the management server 300 together with the connection instruction, the address information of the service provision server 400 is received together with the connection instruction.

In the step S34, the CPU 111 requests the service provision server 400 to establish a tunnel connection using the address information of the service provision server 400, and the process proceeds to the step S35. Specifically, the CPU 111 controls the communication I/F unit 112 to transmit a signal for requesting the start of communication to the address of the service provision server 400.

In the step S35, the CPU 111 determines whether a service connection to the service provision server 400 is established. The process waits until the service connection is established (NO in the step S35). If the service connection is established (YES in the step S35), the process proceeds to the step S36. In the step S36, the CPU 111 determines whether a job is received from the service provision server 400 via a service connection. The process waits until the job is received (NO in the step S36). If the job is received (YES in the step S36), the process proceeds to the step S37. The job received from the service provision server 400 is executed in the step S37, and the process proceeds to the step S38.

The service connection is disconnected in the step S38, and the process returns to the step S33. After the result of execution of the job is transmitted to the service provision server 400 via the service connection, the service connection is disconnected.

Figure 11:
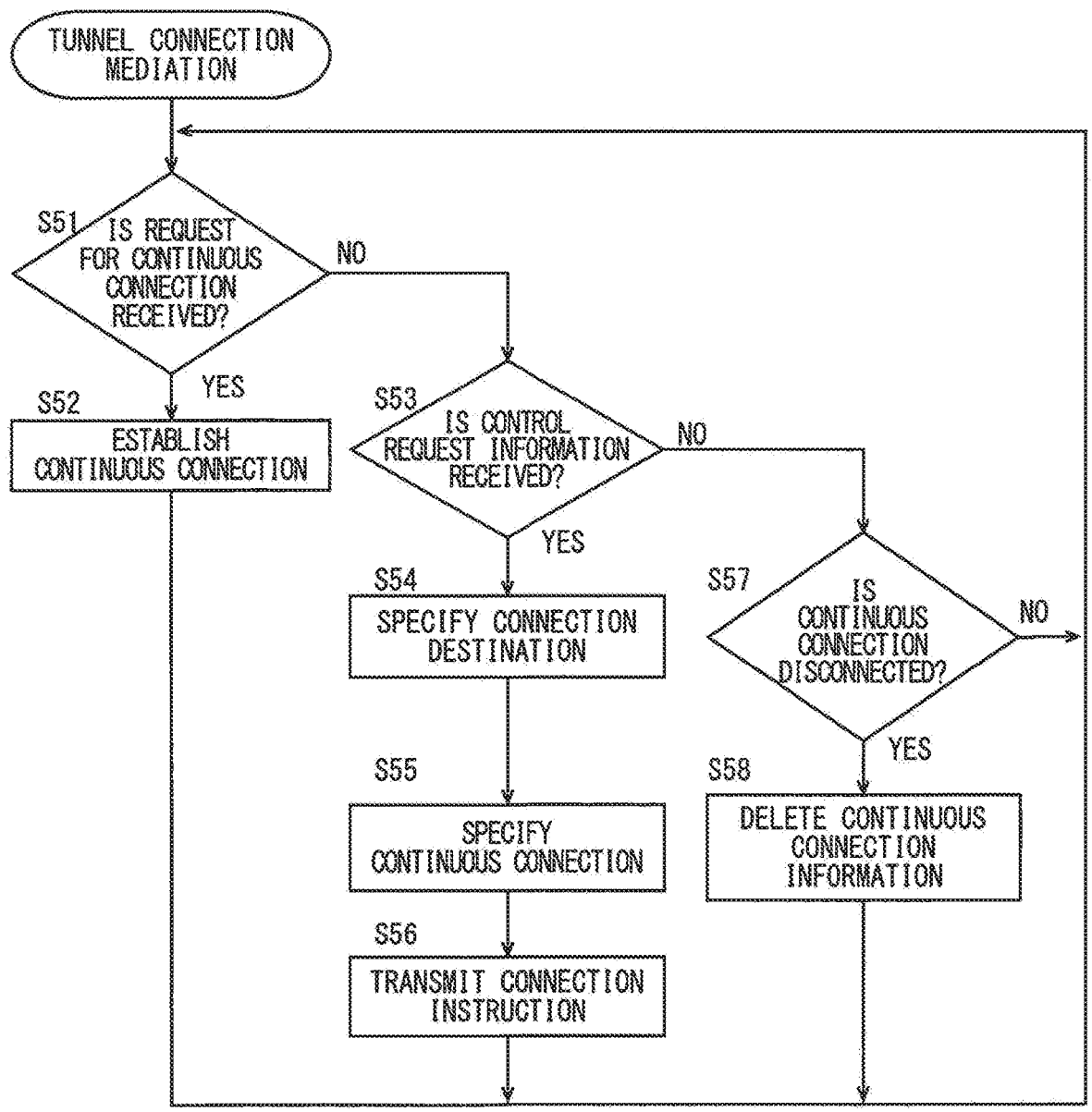
FIG. 11 is a flowchart showing one example of a flow of a tunnel connection mediation process.

FIG. 11 is a flowchart showing one example of a flow of a tunnel connection mediation process. The tunnel connection mediation process is a process executed by the CPU included in the management server 300 in the case where the CPU included in the management server 300 executes a tunnel connection mediation program. Referring to FIG. 11, the CPU included in the management server 300 determines whether a signal for requesting establishment of a continuous connection is received from any one of the MFPs 100, 100A, 100B (step S51). If the signal for requesting establishment of a continuous connection is received, the process proceeds to the step S52. If not, the process proceeds to the step S53. In the step S52, the CPU establishes the continuous connection to the device that has transmitted the signal for requesting establishment of a continuous connection, and the process returns to the step S51. In the case where the continuous connection is established, continuous connection information that associates the continuous connection with the device that has requested establishment of the continuous connection is produced and stored.

In the step S53, the CPU determines whether control request information is received from the assistance server 200. The control request information is the information representing a request for controlling a control subject device made by the service provision server 400. If the control request information is received, the process proceeds to the step S54. If not, the process proceeds to the step S57. The control request information includes the address information of a control subject device and the address information of the service provision server 400. While the control request information is transmitted to the assistance server 200 from the service provision server 400 in the present embodiment, the assistance server 200 transmits the control request information to the management server 300 on behalf of the service provision server 400. Therefore, the control request information is received from the assistance server 200.

The connection destination is specified in the step S54, and the process proceeds to the step S55. The connection destination is the device to be controlled by the service provision server 400. The connection destination is specified based on the address information of the control subject device included in the control request information. In the step S55, the established continuous connection to the control subject device that is the connection destination is specified, and the process proceeds to the step S56. In the step S56, a connection instruction is transmitted to the control subject device via the specified continuous connection, and the process returns to the step S51. The address information of the service provision server 400 included in the control request information is transmitted together with the connection instruction.

In the step S57, the CPU determines whether the continuous connection is disconnected. If the continuous connection is disconnected, the process proceeds to the step S58. If not, the process returns to the step S51. In the step S58, continuous connection information is deleted, and the process returns to the step S51. The continuous connection information that is produced when the continuous connection is established in the step S52 is deleted.

As described above, in order to assist information processing system 1, the assistance server 200 in the present embodiment establishes an assistance connection for communication with each of the MFPs 100, 100A, 100B in response to a request from each of the MFPs 100, 100A, 100B that is a control subject device, requests the management server 300 to control the MFP 100 on behalf of the service provision server 400 in the case where being requested by the service provision server 400 to control the MFP 100, for example, and controls the MFP 100 via the assistance connection and causes the MFP 100 to establish a continuous connection to the management server 300 in the case where being requested by the service provision server 400 to control the MFP 100. The management server 300 establishes a continuous connection for communication with a control subject device in response to a request from the MFP 100, and controls the MFP 100 and causes the MFP 100 to access the service provision server 400 via the continuous connection in the case where being requested by the service provision server 400 to control the MFP 100. In the case where being requested by the service provision server 400 to control the MFP 100, the management server 300 controls the MFP 100 via the assistance connection and causes the MFP 100 to establish a continuous connection to the management server 300. Thus, because the continuous connection to the management server 300 is established by the MFP 100, it is not necessary to have a continuous connection to the MFP 100 at all times in the management server 300. Further, in the case where the service provision server 400 requests the control of the MFP 100, the management server 300 is requested to control the control subject device instead of the service provision server 400. Thus, the management server 300 controls the MFP 100 and causes the MFP 100 to access the service provision server 400. Therefore, the function of the management server 300 is kept. As a result, it is possible to reduce a load applied to the information processing system 1 while keeping the function of the information processing system 1.

Further, in response to receiving a connection request including connection destination address information representing a service provided by the service provision server 400 from the assistance server 200 instead of the service provision server 400, the management server 300 transmits a connection instruction including the connection destination address information to the MFP 100 via a continuous connection similarly to the case where receiving the connection request from the service provision server 400. The assistance server 200 controls the MFP 100 and causes the MFP 100 to request the management server 300 to establish a continuous connection, and causes the MFP 100 to access the service provision server 400 using the connection destination address information included in a connection instruction in response to receiving the connection instruction from the management server 300 via the continuous connection. Therefore, the information processing system 1 can function without modification of the information processing system 1.

Further, the MFP 100 is controlled via the assistance connection to disconnect the continuous connection after establishing the continuous connection. Therefore, the period during which the continuous connection is established between the MFP 100 and the management server 300 can be reduced, and a load applied to the management server 300 can be reduced.

Further, the assistance server 200 determines a point in time at which the MFP 100 disconnects the continuous connection based on the type of a process executed by the MFP 100 that is controlled by the service provision server 400. Thus, the period during which the continuous connection is established can be reduced as much as possible while the period of time during which the MFP 100 is controlled by the service provision server 400 is ensured.

Further, in the case where the number of devices that have established continuous connections among the MFPs 100, 100A, 100B is equal to or larger than a predetermined number, the assistance server 200 causes the device that was the first to establish a continuous connection among the predetermined number or a number larger than the predetermined number of devices to disconnect the continuous connection. Thus, the number of devices that have established continuous connections to the management server 300 becomes smaller than the predetermined number, the load applied to the management server 300 can be prevented from being large.

Further, in the case where the number of devices that have established continuous connections among the MFPs 100, 100A, 100B is equal to or larger than the predetermined number, the assistance server 200 causes the device that is requested to be controlled the least number of times by the service provision server 400 among the predetermined number or a number larger than the predetermined number of the devices to disconnect the continuous connection. Thus, the number of devices that have established continuous connections to the management server 300 becomes smaller than the predetermined number, the load applied to the management server 300 can be prevented from being large.

Further, in the case where the address of the management server 300 is not set as the device to be requested to establish a continuous connection, each of the MFPs 100, 100A, 100B sets the address of the management server 300 as the device that is to be requested to establish a continuous connection. Therefore, it is possible to reduce the period of time required for establishment of a continuous connection by not making the setting since it is not necessary to make the setting in the case where the address of the management server 300 is set as the device to be requested to establish a continuous connection.

Further, in the case where the MFP 100 does not establish a continuous connection, the assistance server 200 notifies the service provision server 400 that the MFP 100 cannot be controlled. Thus, convenience is enhanced for the user who operates the service provision server 400.

Although embodiments of the present invention have been described and illustrated in detail, the disclosed embodiments are made for purposes of illustration and example only and not limitation. The scope of the present invention should be interpreted by terms of the appended claims.

What is claimed is:

1. An assistance server that assists an information processing system, the information processing system including a management server arranged outside of a firewall and a control subject device arranged inside of the firewall, the management server being configured to establish a continuous connection for communication with the control subject device in response to a request from the control subject device, to control the control subject device via the continuous connection, and to cause the control subject device to access a service provision server in a case in which the management device is requested by the service provision server arranged outside of the firewall to control the control subject device, and the assistance server comprising:
a hardware processor, the hardware processor being configured to:
establish an assistance connection for communication with the control subject device in response to a request from the control subject device,
in a case in which the assistance server is requested by the service provision server to control the control subject device, request the management server to control the control subject device on behalf of the service provision server, and
in the case in which the assistance server is requested by the service provision server to control the control subject device, control the control subject device via the assistance connection and cause the control subject device to attempt to establish the continuous connection.

2. The assistance server according to claim 1, wherein:
the management server, in response to receiving a connection request indicating a service provided by the service provision server and including connection destination address information, transmits a connection instruction including the connection destination address information to the control subject device via the continuous connection, and
the hardware processor is configured to:
cause the control subject device to request the management server to establish the continuous connection in response to activation, and
transmit an activation instruction for accessing the service provision server using the connection destination address included in the connection instruction to the control subject device via the assistance connection in response to receiving the connection instruction via the continuous connection from the management server.

3. The assistance server according to claim 1, wherein the hardware processor is further configured to control the control subject device via the assistance connection and cause the control subject device to disconnect the continuous connection after the control subject device establishes the continuous connection.

4. The assistance server according to claim 3, wherein the hardware processor is configured to determine a point in time at which the control subject device disconnects the continuous connection based on a type of a process to be executed by the control subject device that is controlled by the service provision server.

5. The assistance server according to claim 3, wherein the hardware processor, in a case in which a number of control subject devices that have established continuous connections is equal to or larger than a predetermined number, is configured to cause a first control subject device that was first to establish a first continuous connection from among the control subject devices that have the established continuous connections to disconnect the first continuous connection.

6. The assistance server according to claim 3, wherein the hardware processor, in a case in which a number of control subject devices that have established continuous connections is equal to or larger than a predetermined number, is configured to cause a first control subject device that has been requested to be controlled by the service provision server a least number of times from among the control subject devices that have the established continuous connections to disconnect the continuous connection of the first control subject device.

7. The assistance server according to claim 1, wherein the control subject device, in a case in which an address of the management server is not set as a device to be requested to establish the continuous connection, sets the address of the management server as the device to be requested to establish the continuous connection.

8. The assistance server according to claim 1, wherein the hardware processor is further configured to, in a case in which the attempt to establish the continuous connection is unsuccessful, notify the service provision server that the control subject device cannot be controlled.

9. A tunnel connection assistance method that is performed by an assistance server that assists an information processing system, the information processing system including a management server arranged outside of a firewall and a control subject device arranged inside of the firewall, the management server being configured to establish a continuous connection for communication with the control subject device in response to a request from the control subject device, to control the control subject device via the continuous connection, and to cause the control subject device to access a service provision server in a case in which the management device is requested by the service provision server arranged outside of the firewall to control the control subject device, and the tunnel connection assistance method causing the assistance server to perform:
  an assistance connection establishing step of establishing an assistance connection to the control subject device in response to a request from the control subject device,
  a proxy requesting step of, in a case in which the assistance server is requested by the service provision server to control the control subject device, requesting the management server to control the control subject device on behalf of the service provision server, and
  an activating step of, in the case in which the assistance server is requested by the service provision server to control the control subject device, controlling the control subject device via the assistance connection and causing the control subject device to attempt to establish the continuous connection.

10. The tunnel connection assistance method according to claim 9, wherein:
  the management server, in response to receiving a connection request indicating a service provided by the service provision server and including connection destination address information, transmits a connection instruction including the connection destination address information to the control subject device via the continuous connection, and
  the activating step includes:
    causing the control subject device to request the management server to establish the continuous connection in response to activation, and
    transmitting an activation instruction for accessing the service provision server using the connection destination address included in the connection instruction to the control subject device via the assistance connection in response to receiving the connection instruction via the continuous connection from the management server.

11. The tunnel connection assistance method according to claim 9, further including a stop control step of controlling the control subject device via the assistance connection and causing the control subject device to disconnect the continuous connection after the control subject device establishes the continuous connection.

12. The tunnel connection assistance method according to claim 11, wherein the stop control step includes determining a point in time at which the control subject device disconnects the continuous connection based on a type of a process to be executed by the control subject device that is controlled by the service provision server.

13. The tunnel connection assistance method according to claim 11, wherein the stop control step, in a case in which a number of control subject devices that have established continuous connections is equal to or larger than a predetermined number, includes causing a first control subject device that was first to establish a first continuous connection from among the control subject devices that have the established continuous connections to disconnect the first continuous connection.

14. The tunnel connection assistance method according to claim 11, wherein the stop control step, in a case in which a number of control subject devices that have established continuous connections is equal to or larger than a predetermined number, includes causing a first control subject device that has been requested to be controlled by the service provision server a least number of times from among the control subject devices that have the established continuous connections to disconnect the continuous connection of the first control subject device.

15. The tunnel connection assistance method according to claim 9, wherein the control subject device, in a case in which an address of the management server is not set as a device to be requested to establish the continuous connection, sets the address of the management server as the device to be requested to establish the continuous connection.

16. The tunnel connection assistance method according to claim 9, further causing the assistance server to, in a case in which the attempt to establish the continuous connection is unsuccessful, perform an error notifying step of notifying the service provision server that the control subject device cannot be controlled.

17. A non-transitory computer-readable recording medium encoded with a tunnel connection assistance program executable by a computer that controls an assistance server that assists an information processing system, the information processing system including a management server arranged outside of a firewall and a control subject device arranged inside of the firewall, the management server being configured to establish a continuous connection for communication with the control subject device in response to a request from the control subject device, to control the control subject device via the continuous connection, and to cause the control subject device to access a service provision server in a case in which the management device is requested by the service provision server arranged outside of the firewall to control the control subject device, and the tunnel connection assistance program causing the computer to:
- establish an assistance connection to the control subject device in response to a request from the control subject device,
- in a case in which the assistance server is requested by the service provision server to control the control subject device, request the management server to control the control subject device on behalf of the service provision server, and
- in the case in which the assistance server is requested by the service provision server to control the control subject device, control the control subject device via the assistance connection and cause the control subject device to attempt to establish the continuous connection.

* * * * *